(12) United States Patent
Moegling et al.

(10) Patent No.: US 8,628,144 B2
(45) Date of Patent: Jan. 14, 2014

(54) REINFORCEMENT ASSEMBLY FOR REINFORCING A SEAT BELT APPARATUS OF A SEAT ASSEMBLY

(75) Inventors: Peter James Moegling, Brighton, MI (US); Todd Rupert Muck, Fowlerville, MI (US); Robert Joseph Hazlewood, Plymouth, MI (US); Masroor Fahim, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 306 days.

(21) Appl. No.: 13/017,683

(22) Filed: Jan. 31, 2011

(65) Prior Publication Data

US 2012/0193960 A1 Aug. 2, 2012

(51) Int. Cl.
  *B60N 2/00* (2006.01)
  *A47C 7/02* (2006.01)

(52) U.S. Cl.
  USPC ........................... 297/452.18; 297/313

(58) Field of Classification Search
  USPC .................. 297/313, 452.18, 468, 474, 481; 296/63, 65.05
  See application file for complete search history.

(56) References Cited

U.S. PATENT DOCUMENTS

| | | | |
|---|---|---|---|
| 4,289,351 A * | 9/1981 | Wahls | 297/307 |
| 4,527,828 A * | 7/1985 | Groce et al. | 296/65.09 |
| 4,638,546 A * | 1/1987 | Benshoof | 29/525.11 |
| 4,787,512 A * | 11/1988 | Dosser, III | 206/223 |
| 4,978,097 A * | 12/1990 | Froutzis | 248/503.1 |
| 4,993,778 A | 2/1991 | Colin et al. | |
| 5,020,856 A | 6/1991 | George | |
| 5,207,453 A | 5/1993 | Stedman et al. | |
| 5,390,982 A * | 2/1995 | Johnson et al. | 297/410 |
| 5,641,198 A | 6/1997 | Steffens, Jr. | |
| 5,913,567 A * | 6/1999 | Novak et al. | 297/216.1 |
| 6,045,174 A * | 4/2000 | Brancaleone et al. | 296/63 |
| 6,045,186 A * | 4/2000 | Butt et al. | 297/296 |
| 6,371,545 B1 * | 4/2002 | Yang | 296/63 |
| 6,767,055 B1 * | 7/2004 | Sparks | 297/216.14 |
| 6,817,672 B2 * | 11/2004 | Matsunuma | 297/452.18 |
| 6,883,854 B2 * | 4/2005 | Daniel | 296/65.03 |
| 7,004,274 B2 * | 2/2006 | Shibasawa et al. | 180/68.5 |
| 7,040,702 B2 * | 5/2006 | Yamada et al. | 297/331 |

(Continued)

FOREIGN PATENT DOCUMENTS

EP 0590237 A1 4/1994

*Primary Examiner* — Phillip Gabler
(74) *Attorney, Agent, or Firm* — Gifford, Krass, Sprinkle, Anderson & Citkowski, P.C.

(57) ABSTRACT

A reinforcement assembly for reinforcing a seat belt apparatus for use with a seat assembly is provided. The seat assembly includes a seat back frame having a pair of downwardly directed side frame members affixed to the vehicle floor. A top frame member traverses the pair of side frame members. A seat cushion frame is pivotally supported on the seat back frame. The reinforcement assembly includes a floor bracket and an elongated vertically aligned reinforcement member. The floor bracket includes a first side which faces the vehicle floor and an opposite second side. The reinforcement member is positioned between the pair of side frame members and includes a first end and an opposite second end. The first end is affixed to the top frame member of the seat back frame. The second end includes a mounting surface which contacts the second side of the floor bracket and in which the mounting surface is affixed to both the floor bracket and the vehicle floor.

13 Claims, 4 Drawing Sheets

(56) References Cited

U.S. PATENT DOCUMENTS

| | | |
|---|---|---|
| 7,293,835 B2 * | 11/2007 | Yudovich .................. 297/335 |
| 7,416,242 B2 * | 8/2008 | Godfrey et al. .......... 296/187.08 |
| 7,484,786 B2 | 2/2009 | Muck et al. |
| 7,510,245 B2 * | 3/2009 | Okazaki et al. ............... 297/483 |
| 2008/0238170 A1 * | 10/2008 | Seibold ......................... 297/353 |
| 2010/0320826 A1 * | 12/2010 | Wilson et al. ............ 297/452.18 |

* cited by examiner

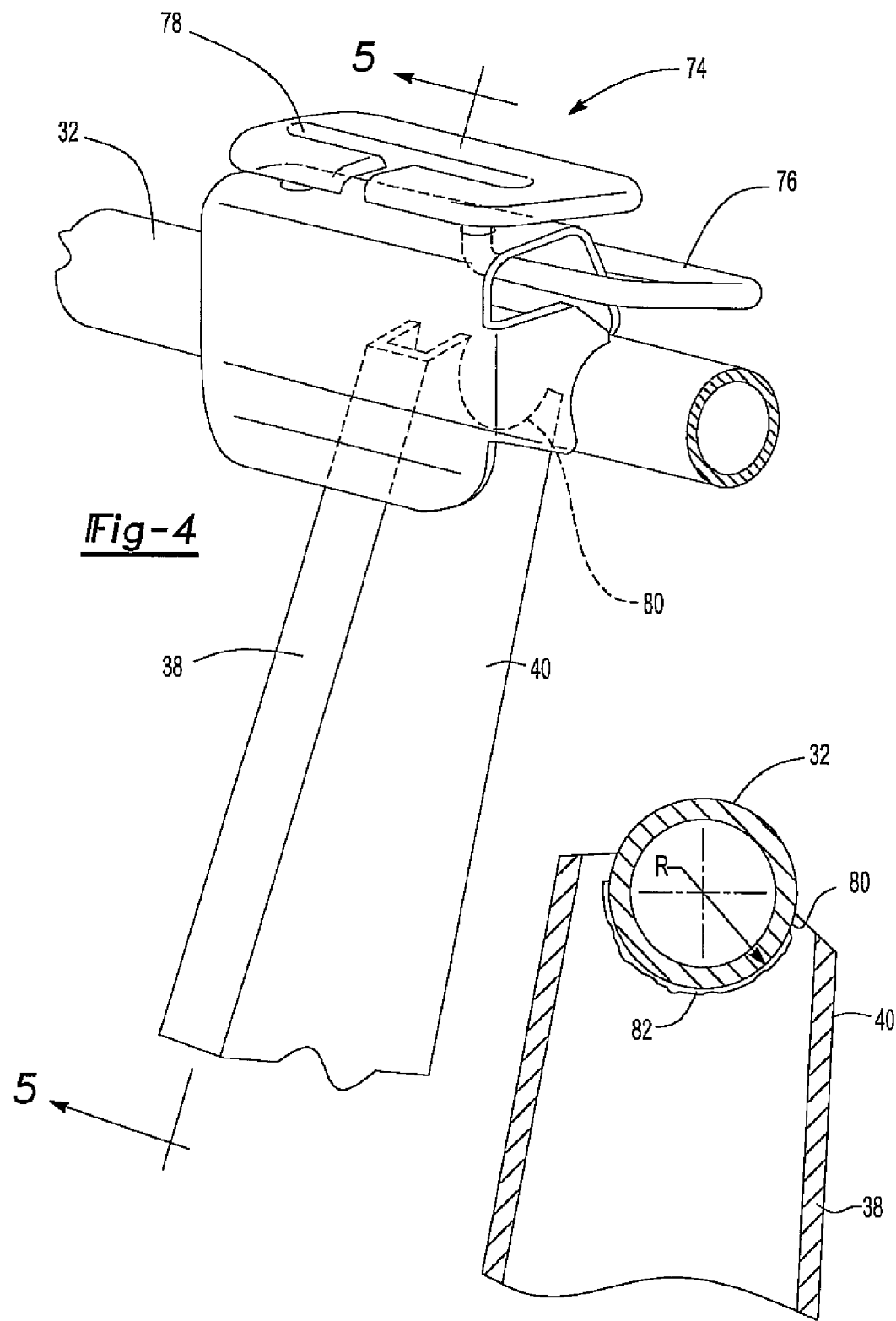

REINFORCEMENT ASSEMBLY FOR REINFORCING A SEAT BELT APPARATUS OF A SEAT ASSEMBLY

FIELD OF THE INVENTION

The present invention relates to a reinforcement assembly for use in reinforcing a seat belt apparatus of a seat assembly. More particularly, to a reinforcement assembly which extends between a top member of a seat back frame and the vehicle floor.

BACKGROUND OF THE INVENTION

It is known in the art to provide a belt integrated seat system in which a seat belt apparatus for securing a passenger in the middle seat of a bench-type seat is positioned within the seat back itself. However, these belt integrated seat systems are typically used with seat backs having a folding and/or reclining seat back. Seat assemblies having rigid seat backs typically forego the use of a belt integrated seat system as the seat belt apparatus can be easily anchored to the vehicle body, such as a rear wall.

However, modern automotive vehicles, typically trucks, include openable rear windows. The rear windows are either electronically or manually lowered such that the rear window is positioned with the rear wall of the truck in the open position. The placement of the rear window within the rear wall decreases the rigidity of the rear wall as the rear wall is now required to house a window. The decrease in rigidity inhibits the ability to secure the seat belt apparatus to the rear wall as the rear wall can not withstand the load imposed by an en engaged seat belt.

Further, the attachment of the seat belt apparatus to the rear wall of the vehicle includes other disadvantages. Specifically, the flexibility in designing the seat assembly is limited due to the constraints of positioning the seat assembly in a predetermined envelope in relation to the rear wall. Although the seat belt apparatus is optionally attached to a roof of a vehicle, the design limitations are still imposed on the seat assembly.

However, the seat belt apparatus cannot be simply affixed to an existing seat assembly as there are numerous governmental safety regulations related to the positioning and structural attachment of the seat belt apparatus. One safety requirement is that the seat assembly includes the proper structural integrity so that the seat assembly is capable of withstanding the load from an engaged seat belt. Typically seat belt apparatuses attached to the vehicle body are provided with the necessary structural reinforcements.

Thus, there exists a need for an improved reinforcement member for reinforcing a seat belt apparatus attached to a seat back which is independent of a rear wall of the vehicle and which provides the necessary structural reinforcement without imposing seat assembly design limitations.

SUMMARY OF THE INVENTION

The present invention provides an improved reinforcement assembly which overcomes the above-mentioned disadvantages of the previously known seat belt apparatus reinforcement means which connect to the rear wall of an automotive vehicle.

In brief, a reinforcement assembly for reinforcing a seat belt apparatus for use with a seat assembly is provided. The seat assembly includes a seat back frame having a pair of downwardly directed side frame members affixed to the vehicle floor. A top frame member traverses the pair of side frame members. A seat cushion frame is pivotally supported on the seat back frame. The reinforcement assembly includes a floor bracket and an elongated vertically aligned reinforcement member. The floor bracket includes a first side which faces the vehicle floor and an opposite second side. The reinforcement member is positioned between the pair of side frame members and includes a first end and an opposite second end. The first end is affixed to the top frame member of the seat back frame. The second end includes a mounting surface which contacts the second side of the floor bracket and in which the mounting surface is affixed to both the floor bracket and the vehicle floor.

The floor bracket includes a first mounting aperture and the mounting surface includes a corresponding second mounting aperture. A fastener extends through the first mounting aperture and the second mounting aperture. The fastener thereby affixes the reinforcement assembly to the vehicle floor. In addition, the floor bracket includes a first attachment aperture and the mounting surface includes a corresponding second attachment aperture. A second fastener extends through the first attachment aperture and the second attachment aperture to attach the reinforcement member to the floor bracket.

The seat belt apparatus attached to the seat back frame includes a seat belt retractor and a seat belt guide. The seat belt retractor is attached to the reinforcement member between the first end and the second end. The seat belt guide is affixed to the top member of the seat back frame and the first end of the reinforcement member is affixed to the top member below the seat belt guide.

BRIEF DESCRIPTION OF THE DRAWINGS

Advantages of the present invention will be readily appreciated as the same becomes understood by reference to the following detailed description when considered in conjunction with the accompany drawings wherein like reference characters refer to like parts throughout the several views and in which:

FIG. 4 is an enlarged partial perspective view illustrating the attachment of the reinforcement member and the seat belt guide to the seat back frame; and FIG. 5 is a partial cross-sectional view illustrating the connection of the reinforcement member to the top member of the seat back frame taken along the line 5-5 of FIG. 4.

DETAILED DESCRIPTION OF THE INVENTION

The present invention has utility as a reinforcement assembly for reinforcing a seat belt apparatus of a seat assembly in an automotive vehicle which overcomes the above-mentioned disadvantages. The inventive reinforcement assembly extends from the seat back to the vehicle floor, allowing the seat belt apparatus to be independent of the rear wall of the automotive vehicle. The independency of the seat belt apparatus and the reinforcement member from the rear wall provides additional design freedom for the seat assembly. Further, by providing a reinforcement member which extends from a top member of the seat back directed to the vehicle floor provides the required structural reinforcement for the seat belt apparatus.

Figure 1:
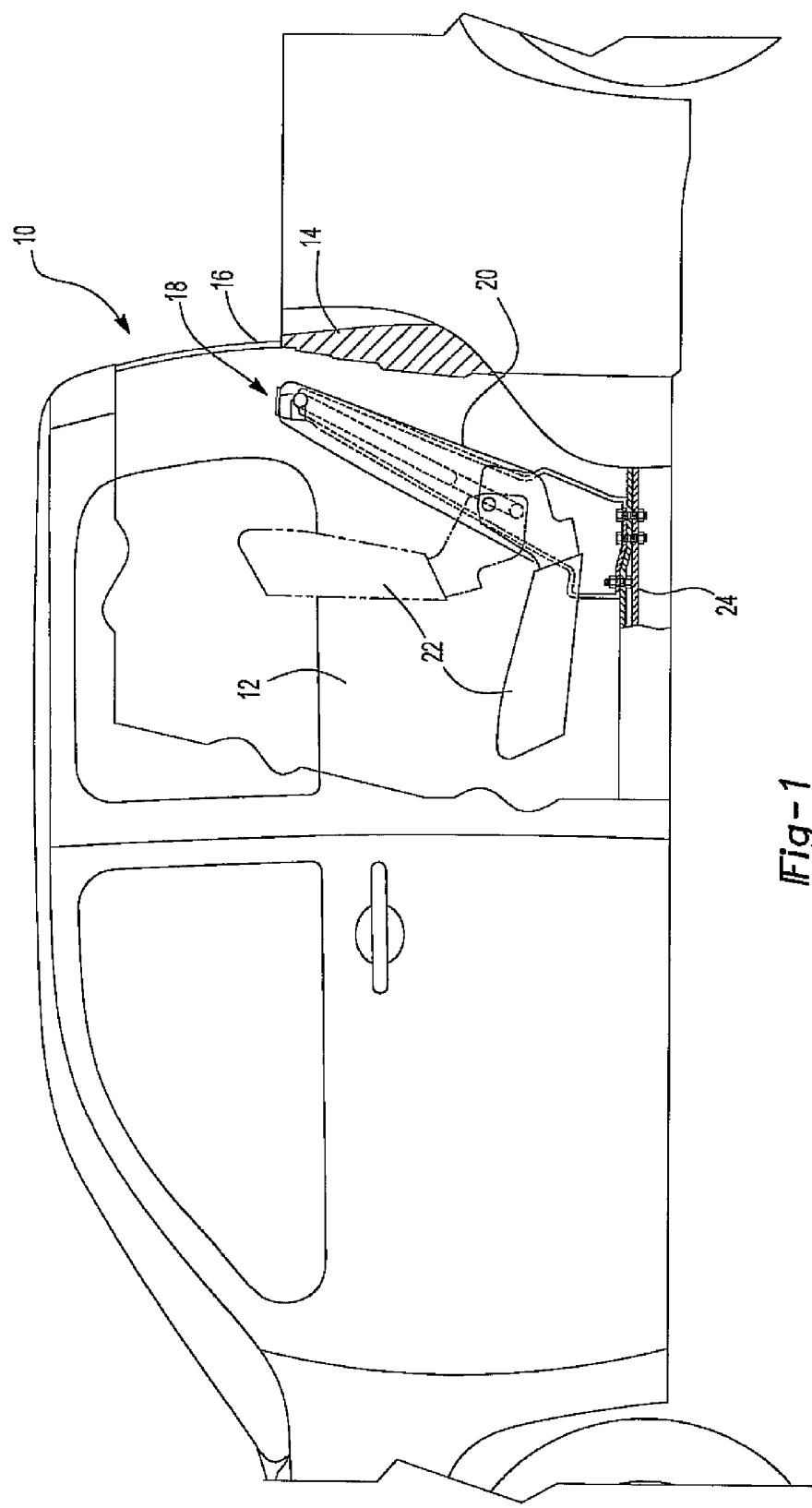
FIG. 1 illustrates an automotive vehicle having the inventive reinforcement assembly.

With reference to FIG. 1, an automotive vehicle, specifically a truck, is generally illustrated at 10. The automotive vehicle includes a passenger compartment 12 defined in part by a rear wall 14 and a rear window 16. A seat assembly 18 is positioned within the passenger compartment 12 of the automotive vehicle 10.

The seat assembly 18 includes a seat back 20 and a seat cushion 22 for supporting an occupant above a vehicle floor 24. As seen in FIG. 1, the seat back 20 is connected to the vehicle floor 24 and is independent of the rear wall 14.

Figure 2:
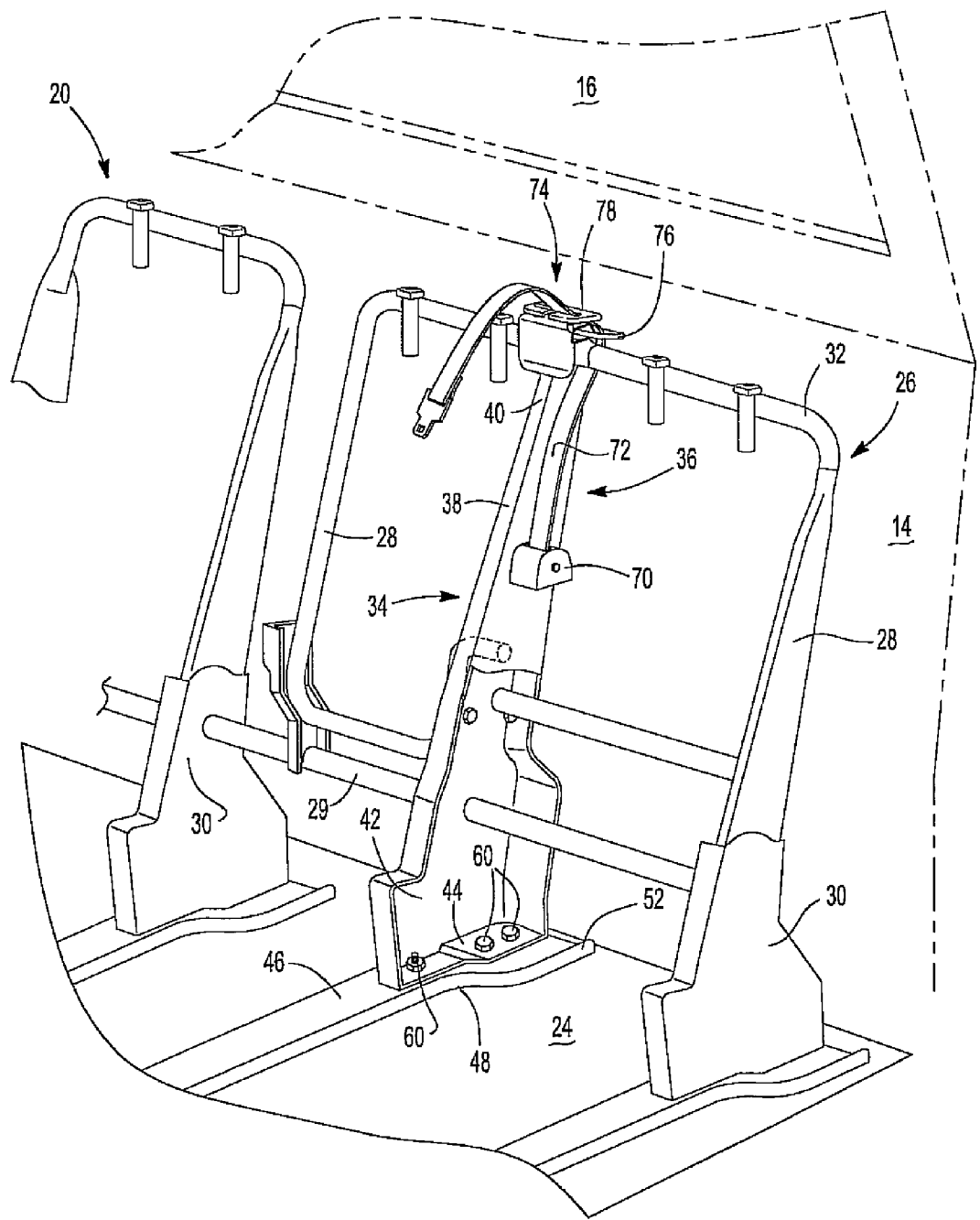
FIG. 2 is a partial perspective view of a seat assembly having the reinforcement assembly and the seat belt apparatus.

Referring to FIG. 2, the seat back 20 includes a seat back frame 26 having a generally inverted U shape. The seat back frame 26 includes a pair of generally downwardly directed side frame members 28 which connect to the vehicle floor 24 through brackets 30. As seen in FIG. 2, the side frame members 28 are optionally attached to the vehicle floor 24 by an adjacent bracket 30 which is connected to the side frame member 28 by a connector member 29.

A generally horizontal top frame member 32 traverses the pair of side frame members 28. Positioned between the pair of side frame members 28 is a reinforcement assembly 34 for reinforcing a seat belt apparatus 36.

The reinforcement assembly 34 includes an elongated vertically aligned reinforcement member 38 having an upper first end 40 and an opposite lower second end 42. The lower end 42 includes a mounting surface 44 which is generally normal to the longitudinal direction of the reinforcement member 38. An elongated floor bracket 46 is disposed between the reinforcement member 38, specifically the mounting surface 44, and the vehicle floor 24. It is appreciated, of course, that the reinforcement member 38 is optionally formed of two separate pieces as seen in FIGS. 1 and 2, or as a single monolithic structure as seen in FIG. 3.

Figure 3:
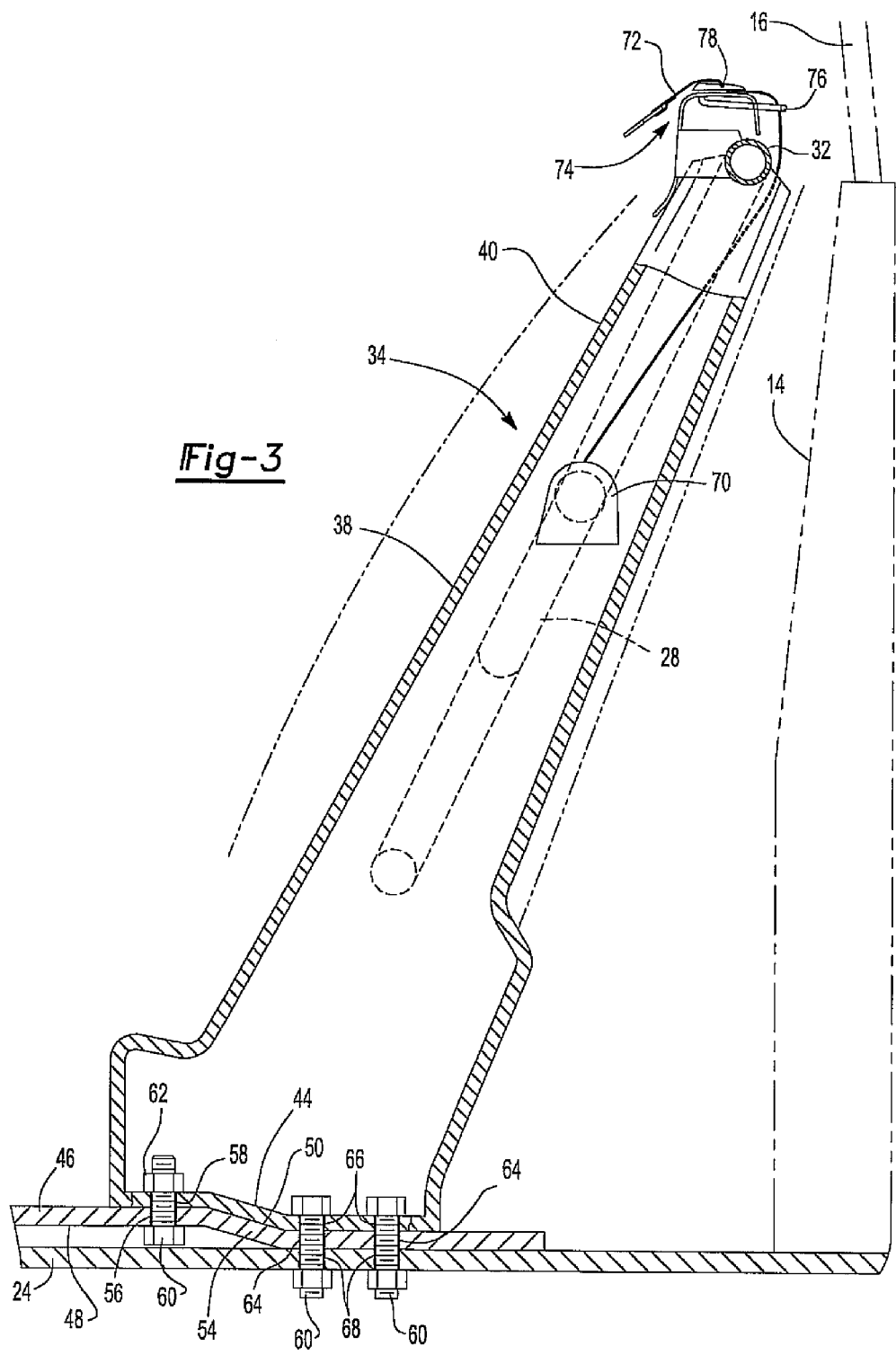
FIG. 3 is a partial cross-sectional view illustrating the connection of the reinforcement assembly to the seat back frame and the vehicle floor.

As best seen in FIG. 3, the floor bracket 46 includes a lower first surface 48 which faces the vehicle floor 24. An opposite upper second surface 50 of the floor bracket 46 contacts the mounting surface 44 of the reinforcement member 38. The floor bracket 46 includes side edges 52 and offset portion 54 which spaces a portion of the floor bracket 46 apart from the vehicle floor 24.

The floor bracket 46 includes a first attachment aperture 56 which corresponds to a second attachment aperture 58 formed in the mounting surface 44 of the reinforcement member 38. A fastener 60 extends through the first attachment aperture 56 and the second attachment aperture 58 thereby attaching the floor bracket 46 to the reinforcement member 38, specifically the mounting surface 44. It is appreciated, of course, that the fastener 60 is depicted as a bolt 60 with corresponding nut 62. However, the fastener 60 is not limited to such an arrangement, and is optionally a rivet, a self-driving screw, or a spot weld.

The floor bracket 46 includes a first mounting aperture 64 extending from the lower side 48 to the upper side 50. The mounting surface 44 includes a second mounting aperture 66 which corresponds to the first mounting aperture 64 formed in the floor bracket 46. A floor aperture 68 is positioned so as to correspond with the first mounting aperture 64 and the second mounting aperture 66 such that fastener 60 extends through the second mounting aperture 66, the first mounting aperture 64, and the floor hole in order to affix the reinforcement member 38, specifically the mounting surface 44, and the floor bracket 46 to the vehicle floor 24.

As best seen in FIG. 2, the seat belt apparatus 36 includes a seat belt retractor 70 operable to retract and restrain an occupant in conjunction with a seat belt strap 72. It is appreciated, of course, that the seat belt retractor 70 and the strap 72 are optionally any of a known seat belt apparatus known to those of ordinary skill in the art.

The seat belt retractor 70 is positioned on the reinforcement member 38 between the upper first end 40 and the lower second end 42. The seat belt apparatus 36 further includes a seat belt guide 74 which guides the strap 72 from a rear side of the seat back 20 to a front side. The seat belt guide 74 includes a guide member 76 which receives a portion of the strap 72 to restrain the strap 72 within the proper position. A guide plate 78 is positioned on an upper part of the seat belt guide 74 so as to guide the strap 72 towards the front side of the seat back 20.

As best seen in FIG. 4, the seat belt guide 74 is positioned on the top frame member 32 along an upper side thereof. The upper first end 40 of the reinforcement member 38 is affixed to the top frame member 32 directly below the seat belt guide 74. The positioning and the attachment of the reinforcement member 38 to the top frame member below the seat belt guide 74 allows the reinforcement member 38 to absorb the load imposed on the seat belt guide 74 through the strap 72 when the seat belt apparatus 36 is engaged in restraining an occupant.

The force of the engaged strap 72 is transferred from the seat belt guide 74 and the top member 32 to the vehicle floor 24 via the reinforcement assembly 34, specifically, due to the connection of the mounting surface 44 of the reinforcement member 38, the floor bracket 46, and the vehicle floor 24. As such, the seat belt apparatus 36 is provided with the required reinforcement as loads imposed thereon are transferred to the vehicle floor 24 allowing the seat assembly 18, specifically the seat back 20, and the seat belt apparatus 36 to be independent of the rear wall 14 of the vehicle 10.

As best seen in FIG. 5, the upper first end 40 of the reinforcement member 38 is provided with a contoured surface 80 which is complementary to the profile or cross section of the top member 32. In the illustrated embodiment, the top member 32 is formed as a cylindrical bar having a generally circular cross section. The top frame member 32 includes an outer radius R and the contoured surface 80 includes a radius of curvature equal to the outer radius R of the top frame member 32. It is appreciated, of course, that the profile or cross section of the top member is not limited to such an arrangement and is optionally triangular, rectangular, or any other regular or irregular shape.

The upper end 40 of the reinforcement member 38 is attached to the top member 32 by weld 82 along the contoured surface 80. The positioning of the connection of the upper first end 40 of the reinforcement member 38 is particularly advantageous as during application of a load via the seat belt strap 72 the top frame member 32 will be forced against the contoured surface 80 thereby maintaining the integrity of the weld 82.

From the foregoing, it can be seen that the present invention provides an inventive reinforcement assembly for reinforcing a seat belt apparatus to a seat back frame which is independent of a rear wall of a vehicle. Further, the attachment of the reinforcement member to the top member below the seat belt guide allows the loads imposed by the seat belt strap to be transferred to the vehicle floor through the reinforcement member 38 and the floor bracket 46. Having described the invention, however, many modifications thereto will become apparent to those skilled in the art to which it pertains without deviation from the spirit of the invention as defined by the scope of the appended claims.

It is claimed:

1. A reinforcement assembly for reinforcing a seat belt apparatus for use with a seat assembly for supporting an occupant above a floor, the seat assembly having a seat back frame with a pair of side frame members, a top frame member traversing the pair of side frame members, and a seat cushion frame pivotally supported on the seat back frame, said reinforcement assembly comprising:
   an elongated vertically aligned reinforcement member positioned between the pair of side frame members, said reinforcement member having a first end and an opposite second end, said first end affixed to the top frame member, said second end having a mounting surface; and
   a floor bracket having a planar portion positioned between said mounting surface and the floor, said planar portion having a first surface and a second surface opposite said first surface, said first surface contacting the floor, said second surface contacting said mounting surface, said planar portion of said floor bracket directly mounted to both said reinforcement member and the floor.

2. The reinforcement assembly of claim 1, wherein said planar portion of said floor bracket includes a first mounting aperture, said mounting surface includes a corresponding second mounting aperture, and wherein a fastener extends through said first mounting aperture, said second mounting aperture and the floor to affix the reinforcement assembly to the floor.

3. The reinforcement assembly of claim 2, wherein said floor bracket includes an offset portion spaced apart from the floor, said offset portion having a first attachment aperture, said mounting surface includes a corresponding second attachment aperture, and wherein a second fastener extends through said first attachment aperture and said second attachment aperture to attach said reinforcement member to said floor bracket.

4. The reinforcement assembly of claim 3, wherein said mounting surface is generally normal to the longitudinal direction of said reinforcement member.

5. The reinforcement assembly of claim 1, wherein the seat belt apparatus includes a seat belt retractor attached to said reinforcement member between said first end and second end.

6. The reinforcement assembly of claim 5, wherein the seat belt apparatus further includes a seat belt guide attached to the top frame member, and wherein said first end of said reinforcement member is affixed to the top frame member below the seat belt guide.

7. A seat assembly for supporting an occupant above a floor, said seat assembly comprising:
   a seat back frame having a pair of side frame members, a top frame member traversing said pair of side frame members;
   an elongated vertically aligned reinforcement member positioned between said pair of side frame members, said reinforcement member having a first end and an opposite second end, said first end affixed to said top frame member, said second end having a mounting surface; and
   a floor bracket having a planar portion positioned between said mounting surface and the floor, said planar portion having a first surface and a second surface opposite said first surface, said first surface contacting the floor, said second surface contacting said mounting surface, said planar portion of said floor bracket directly mounted to both said reinforcement bracket and the floor.

8. The seat assembly of claim 7, wherein said planar portion of said floor bracket includes a first mounting aperture, said mounting surface includes a corresponding second mounting aperture, and wherein a fastener extends through said first mounting aperture, said second mounting aperture and the floor to affix the reinforcement assembly to the floor.

9. The seat assembly of claim 8, wherein said floor bracket includes an offset portion spaced apart from the floor, said offset portion having a first attachment aperture, said mounting surface includes a corresponding second attachment aperture, and wherein a second fastener extends through said first attachment aperture and said second attachment aperture to attach said reinforcement member to said floor bracket.

10. The seat assembly of claim 9, wherein said mounting surface is generally normal to the longitudinal direction of said reinforcement member.

11. The seat assembly of claim 7, further comprising a seat belt apparatus for restraining the occupant, said seat belt apparatus includes a seat belt retractor attached to said reinforcement member between said first end and second end.

12. The seat assembly of claim 11, wherein said seat belt apparatus further includes a seat belt guide attached to said top frame member, and wherein said first end of said reinforcement member is affixed to said top frame member below said seat belt guide.

13. The seat assembly of claim 7, further comprising a seat cushion frame, and wherein said seat cushion frame is pivotally attached to said seat back frame.

* * * * *